United States Patent [19]
Klier et al.

[11] Patent Number: 5,382,172
[45] Date of Patent: Jan. 17, 1995

[54] SPIRAL CABLE BOX

[76] Inventors: Jurgen Klier, Am Herrnacker 9, D 63303 Dreieich; Gerhard Satzinger, Jaegerluk 3, D 91735 Muhr am See; Gerhard Schule, Kaadenerstr. 3, D 91785 Pleinfeld, all of Germany

[21] Appl. No.: 92,271

[22] Filed: Jul. 15, 1993

Foreign Application Priority Data

Jul. 15, 1992 [DE] Germany ............... 4223308

[51] Int. Cl.⁶ .......................................... H01R 39/02
[52] U.S. Cl. ........................................ 439/164; 439/15
[58] Field of Search ............................ 439/15, 164

[56] References Cited

U.S. PATENT DOCUMENTS

| 4,824,396 | 4/1989 | Sasaki et al. | 439/164 |
| 4,936,782 | 6/1990 | Bannai et al. | 439/15 |

FOREIGN PATENT DOCUMENTS

| 0478455 | 9/1991 | European Pat. Off. |
| 8505830 | 3/1985 | Germany. |
| 3641706 | 12/1986 | Germany. |
| 4031235 | 10/1990 | Germany. |

Primary Examiner—Gary F. Paumen
Attorney, Agent, or Firm—Dena Meyer Weker, Esquire

[57] ABSTRACT

A spiral cable which comprises a lower (inner) box part and an upper (outer) box part to wind up a cable spiral and install it at an intended assembly site, for instance at the steering wheel of an automobile. In an outer cylinder wall and an inner cylinder wall the spiral cable box is provided with cable entry openings which allow the cable spiral to be wound up in the box and which allow for the formation of angular end areas which are aligned in parallel to the box to subsequently make an electrical connection.

16 Claims, 10 Drawing Sheets

SPIRAL CABLE BOX

FIELD OF THE INVENTION

The invention relates to a spiral cable box for taking up and installing a spiral cable, in particular, a spiral cable for an electrical airbag.

BACKGROUND OF THE INVENTION

As is well known, airbags are impact protection bags in automobiles. In the event of a crash, a control device triggers an inflation mechanism which fills the airbag with air within a split second and thus protects the passengers at least from serious injuries as may be caused by the effects of a crash impact.

In the past, airbag devices were installed in the dash face of the steering wheel. Since the control devices which trigger the inflation of the airbag are located outside of the steering wheel, the electrical connection between the airbag and the control devices must allow for relative turns between the former and the latter because the airbag turns with the dash face of the steering wheel while the control device is stationary.

To create this electrical connection, state of the art technology provides for the use of a spiral cable box containing a flat cable which is wound up spirally. The known spiral cable box is arranged between the steering column and the dash face of the steering wheel in such a way that one end of the flat cable contained in the spiral cable box is guided to the airbag in the dash face and the other to the control device, through the steering column.

The state of the art spiral cable box consists of a lower box part which is firmly connected with the steering wheel, and an upper box part which can be moved relative to the lower box part and is accommodated in the latter. The lower box part comprises two concentric cylinder walls, namely an inner cylinder wall and an outer cylinder wall, which are connected with each other through an annular disk wall. The cable spiral is placed into the cable receiving chamber of the lower box part which is open towards the top. The cable receiving chamber is closed off towards the top by an annular disk wall of the upper box part, adjacent to whose outer circumference there is an outer cylinder wall which is supported against the annular disk wall of the lower box part to set the distance between the annular disk wall of the lower box part and the annular disk wall of the upper box part.

One outlet piece each is provided on the annular disk wall of the upper and the lower box part to guide out angled end areas of the cable spiral. Through these outlet pieces one spiral cable end each must be guided after the cable spiral has been inserted into the spiral cable box. The ends of the spiral cable are provided with a plastic reinforcement material which serves to form the angled end areas of the spiral cable on the one hand and acts as a strain relief on the other hand. The cable reinforcements are either injected around or clipped onto the cable and are expensive to produce. Furthermore, they increase the cross section of the spiral cable in the angular end area which extends into the cable receiving chamber, an increase of size which is unfavorable for the installation of the spiral cable box. Furthermore, the larger cross section in the angular end area creates a relatively large free space between the cable spiral and the cable receiving chamber which is limited by the annular disk walls on top and on bottom.

Therefore the cable spiral is axially movable, with the exception of the angular end areas, and this play may cause an undesirable clattering noise.

Furthermore, there is an additional handling process after winding up the cable spiral, when the cable spiral is inserted into the spiral cable box, either before or during its installation in the steering wheel. These additional handling processes are suspect as damage to the sensitive cable spiral by inexpert handling is a possibility. Also additional processes for installation of the sensitive cable spiral as well as installation at a number of windings different to those required for the neutral position of the steering wheel are required.

There is a need for an improved quiet cable box with cable spiral that can be assembled at the final place of installation and eliminates many unnecessary parts.

SUMMARY OF THE INVENTION

A spiral cable box is provided for accommodation and installation of a cable spiral, in particular a cable spiral for an electrical airbag whose cable ends are designed as an inner and an outer angular end area in that the ends of the cable spiral are angled towards different sides of the spiral level and who are provided with a strain relief device which comprises a first box part and a second box part which can be turned relative to each other and which include an annular cable accommodation chamber. The box parts are provided with cable entry openings to guide the inner and the outer angular end area out of the box. The cable accommodation chamber is limited axially to one side by a disk-shaped wall (disk wall) and towards the outside, by an outer cylinder wall of the first box part (outer part), and axially towards the other side by a disk wall, and radially at the inside, by an inner cylinder wall of the second box part (inner part), wherein the cable entry openings are arranged in the outer cylinder wall of the outer part and the inner cylinder wall of the inner part and the cable entry openings are provided with a deflection device acting as a strain relief and forming the angular end area of the cable spiral.

In a preferred embodiment of the spiral cable box of the invention, the outer part which incorporates the outer cylinder wall forms the upper box part and the inner part which incorporates the inner cylinder wall forms the lower box part. In this way the lower box part partially protrudes over the upper box part like a roof, which effectively prevents the ingress of impurities into the cable receiving chamber through the annular gap, which is necessary to make the box parts movable relative to each other.

Openings in the outer cylinder wall of the upper box part towards the bottom edge are particularly advantageous because they make sure that any abraded material which may be produced due to the relative turns between the box parts and the cable spiral or condensed water formed in the cable accommodation chamber can escape. Both the prevention of the ingress of impurities into the cable accommodation chamber and the discharge of condensed water or abraded cable material out of the cable accommodation chamber increase the service life of the cable spiral and the spiral cable box.

In a particularly preferred embodiment of the spiral cable box, the deflection devices are provided with a deflection edge to create an angle in the cable ends and with a fixing device to hold the angular end areas stationary relative to the box. This allows for the required strain relief of the cable by the angular end areas themselves, without the necessity of special measures being taken with the spiral cable. This means a considerably simplified production of the cable spiral.

The fixing device may be designed such that a first fixing position (pre-fixing) and a second fixing position (final fixing) can be set so that the pre-fixing constitutes a guide to form an angular end area and the final fixing holds stationary and reduces strain in the angular end area.

The fixing devices are preferably so securely connected with the spiral cable box that they cannot be lost. Especially if the spiral cable box and the fixing devices are one-piece is it advantageous if the fixing devices are provided with engagement mechanisms which can be inserted into engagement recesses to obtain various engagement positions.

A particularly advantageous fixing device is provided with at least one engagement mechanism which is guided through a corresponding opening in the cable end area and accommodating the cable end area between the fixing device and the box can be inserted into an engagement opening of the box. Such a fixing device does not only form an angular end area while providing for a strain relief but also allows for an exact positioning of the cable area which forms the angular end area, relative to the box.

The edge area of the inner cylinder wall of the inner part is provided with at least one engagement mechanism to connect the inner part of the spiral cable box with the outer part. Said engagement mechanism engages through a central opening in the disk wall of the outer part behind the disk wall. In this position the disk wall of the inner part is supported within a support guide of the outer cylinder wall of the outer part.

Due to this arrangement of the assembled box parts, a sliding guide is created between the disk wall of the outer part and the engagement mechanism of the inner cylinder wall of the inner part, and between the disk wall circumference of the inner part and the support guide in the outer cylinder wall of the outer part. Due to this double sliding guide, the box parts are guided at particularly low friction. Furthermore, the double sliding guide with an axial distance between the two guides allows for the most accurate way of guiding the box parts and prevents excessive play between the box parts, which might cause undesirable noise when the box parts are turned relative to each other.

In a second embodiment of the inner part, the disk wall and the inner cylinder wall can be made from different materials. This two-piece design has the advantage that the disk wall which incorporates attachment mechanisms for attachment at the steering wheel may be made from metal whereas the inner cylinder wall may be made from a plastic material. The attachment threads may be provided directly on the disk wall, without having to use separate thread inserts, whereas the inner cylinder wall may be made from a flexible plastic, making the design of the engagement mechanisms particularly simple.

If the inner circumferential edge of the disk wall of the inner part with a center opening is designed such that it protrudes over the inner cylinder wall of the inner part inwards, the inner part can be put on a winding arbor to enable the inner part can be turned when the cable spiral is being wound up, with the winding arbor not detracting from the accessibility of the inner cylinder wall which is required to adjust the fixing device.

A process is also provided to bring a cable spiral into a spiral cable box of the invention. An end area of the spiral cable is guided through the outer and the inner cable entry opening, the cable end which comes from the inner entry opening is diverted by the inner deflection device to form the inner angular end area in one direction towards the longitudinal axis of the box and the inner angular end area is held stationary by the inner fixing device and the inner part with the inner cylinder wall is turned relative to the outer part with the outer cylinder wall, such that the cable is spirally wound up on the outer side of the inner cylinder wall which serves as a winding core within the cable receiving chamber, and the turning is continued until the cable spiral has reached the required number of windings, and an end area of the cable which protrudes outwards through the cable entry opening is guided into the other direction towards the longitudinal box axis around the outer deflection device to form the outer angular end area, and the outer angular end area is held stationary by the outer fixing device.

The process of the invention allows a cable spiral to be formed in a spiral cable box which can be subsequently installed in the steering wheel of an automobile without the spiral cable having to be handled outside of the spiral cable box.

When the inner angular end area is formed, the inner fixing device is preferably in its pre-fixing position. After the cable has been guided through and the angular end area has been formed, the inner fixing device is brought into its final engagement position. In this way the inner angular area is aligned and held stationary at the box by the fixing device in a pull-resistent way. The outer fixing device, which is initially in its open position, is brought into its engagement position in order to form and make stationary the outer angular end area after the winding process of the cable spiral in order to align and fix the angular end area.

The forming of the angular end areas by holding the spiral cable ends stationary on the spiral cable box additionally creates a strain relief for the spiral cable ends so that they need not have a special design. This is particularly advantageous because the strain relief of the cable ends used to be effected in that they were covered by an injected material which often damaged the sensitive flat cables or the thin conductor paths contained therein due to temperature and/or pressure.

The same spiral cable box is used to perform the winding process. This is a change from the conventional procedure in which the spiral cable was produced in a separate winding device which was manually inserted into a cable box in a steering wheel. The spiral cable box provided herein allows for winding up of the cable spiral, installation at a certain place as well as provides a means of transporting the spiral cable thus protecting it from damage.

DETAILED DESCRIPTION OF THE PREFERRED EMBODIMENTS

A spiral cable box is provided for accommodation and installation of a cable spiral for use in an electrical airbag whose cable ends are designed as an inner and outer angular end area in that the ends of the cable spiral are angled towards different sides of the spiral level and are provided with a strain relief device which comprises a first box part and a second box part which can be turned relative to each other and which include an annular cable accommodation chamber. The box parts are provided with cable bushings to guide the inner and the outer angular end area out of the box. The cable accommodation chamber is limited axially to one side by a disk-shaped wall (disk wall) and towards the outside, by an outer cylinder wall of the first box part and axially towards the other side by a disk wall and radially at the inside, by an inner cylinder wall of the second box part, wherein the cable bushings are arranged in the outer cylinder wall of the outer part and the inner cylinder wall of the inner part and the cable bushings are provided with a deflection device acting as a strain relief and forming the angular end of the cable spiral.

The invention is best understood by reference to the accompanying drawings.

Figure 1:
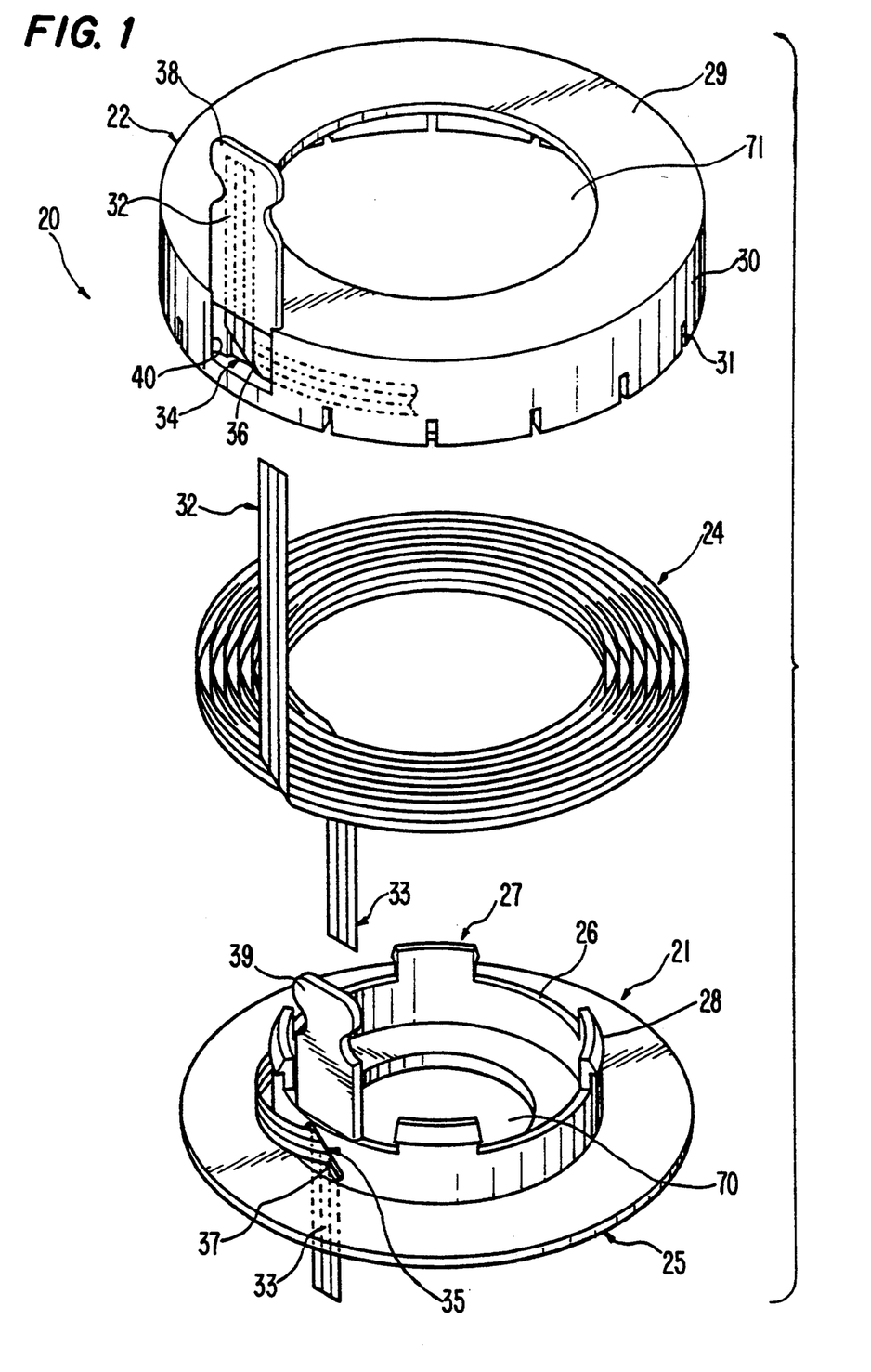
FIG. 1 is an exploded view of a spiral cable box of the invention, with a cable spiral mounted therein.

FIG. 1 shows an exploded view of an embodiment of a spiral cable box 20 of the invention, which comprises a lower box part 21 which is formed by an inner part of the spiral cable box 20 and an upper box part 22 which is formed by an outer part of the spiral cable box 20. When the upper box part 22 is put on top of the lower box part 21, a cable receiving chamber 23 is formed between them (see FIG. 2), which serves to take up a cable spiral 24.

Figure 2:
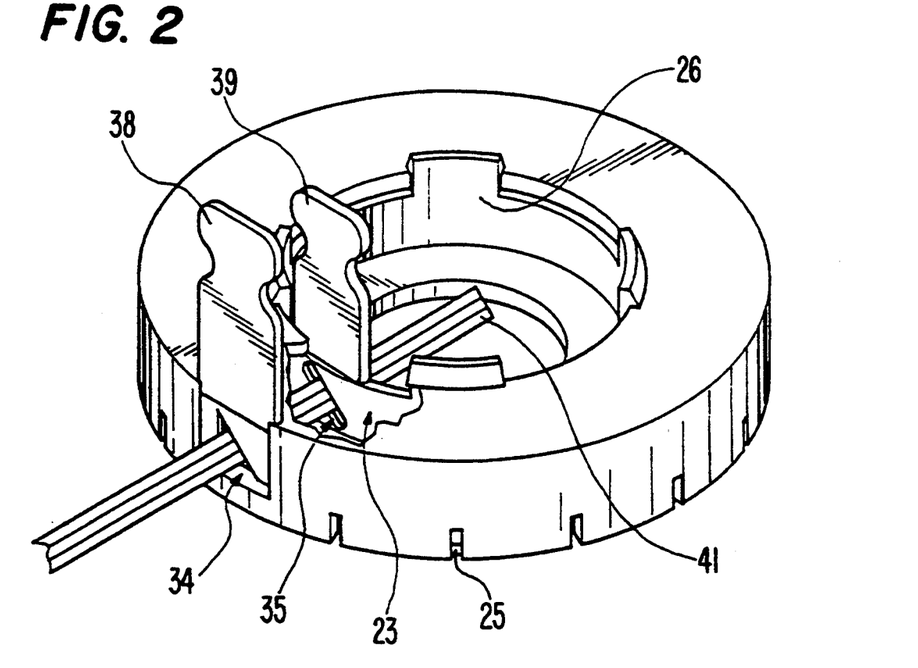
FIG. 2 is a view of the insertion of a cable end into the spiral cable box for fixing and winding the spiral cable in the spiral cable box as further shown in the following figures.

The lower box part 21 is provided with an annular disk wall 25 with a central opening 70 and an inner cylinder wall 26 which is approximately perpendicular to the annular disk wall 25. The circumference of the inner cylinder wall 26 is provided with engagement devices 27 at its upper edge, which faces away from the annular disk wall 25. The engagement devices 27 have outwardly directed engagement noses 28. As is also indicated in FIG. 2, these noses engage behind the inner circumferential edge of an annular disk wall 29 of the upper box part 21, which is provided with a central opening 71, after the upper 22 and the lower box part 21 have been assembled so that they detachably hold together the box parts.

An outer cylinder wall 30 is arranged at the outer circumferential edge of the annular disk wall 29, approximately perpendicular to the annular disk wall 29, to form the upper box part 22. At its lower edge, the outer cylinder wall 30 is provided with openings 31 which extend towards the edge.

Cable entry openings 34 and 35 are provided in the outer cylinder wall 30 of the upper box part 22 and in the inner cylinder wall 26 of the lower box part 21 so that cable ends of the flat cable which forms the cable spiral 24 can be guided through these and that angular end areas 32, 33 of the cable spiral 24 can be formed.

The outer cable entry opening 34 is triangular; the edge which forms the hypotenuse of the triangle and which is arranged diagonally in the outer cylinder wall 30, forms a deflecting edge 36. The inner cable entry opening 35 consists of a slot with parallel slot edges wherein the slot edge which faces the annular disk wall 25 forms a deflecting edge 37.

Additionally, the cable entry openings 34 and 35 are provided with fixing devices 38, 39 which are displaceably arranged in grooved guides 40 of the outer cylinder wall 30 or the inner cylinder wall 26. The fixing devices 38, 39 interact with the deflecting edges 36, 37 to form the angular end areas 32, 33 of the cable spiral 24, as indicated by the dotted drawing of the angular end areas 32, 33 in the upper box part 22 and the lower box part 21.

The process of how the cable spiral 24 is inserted into the spiral cable box 20 can be seen in FIGS. 2-6.

FIG. 2 shows a starting phase of the process in which one cable end of the flat cable which is to form the cable spiral 24 is guided through the outer cable entry opening 34 and the inner cable entry opening 35 until a protruding cable piece 41 is formed in the desired length on the inner side of the inner cylinder wall 26. In this position the fixing devices 38, 39 are in an open position so that the cable entry openings 34 and 35 are free.

Figure 3:
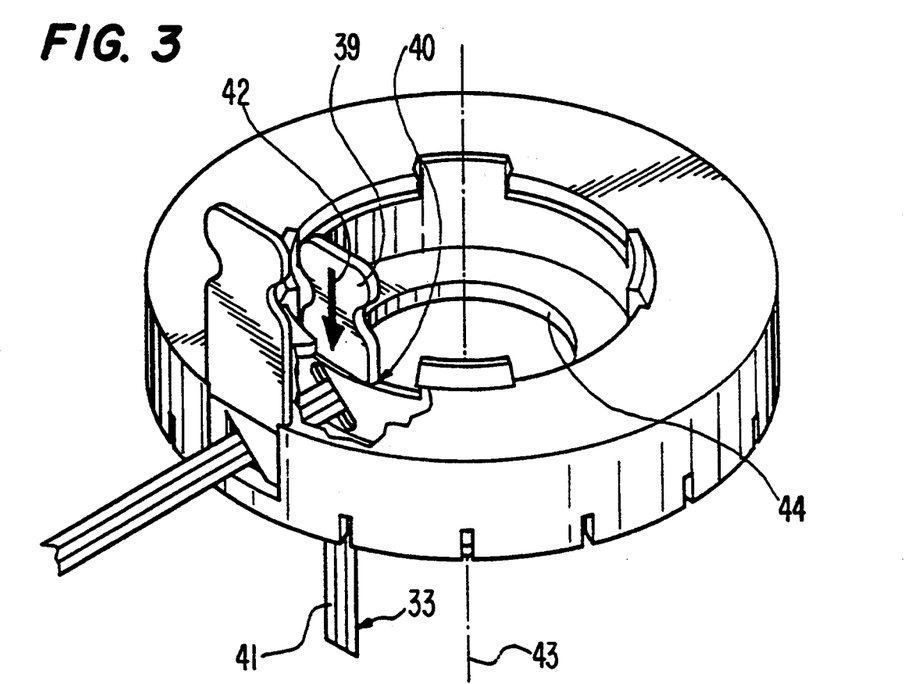
FIG. 3 is a design of an inner angular end area of the flat cable.

As shown by the arrow 42 in FIG. 3, the fixing device 39 is then displaced downwards in the grooved guide 40, whereby the protruding cable part 41 is swivelled around the deflection edge 37 until a parallel alignment with a longitudinal box axis has been achieved. To achieve this parallel alignment of the protruding cable part 41 despite an inner protruding part 44 projecting from the inner cylinder wall 26 of the annular disk wall 25, a recess 45 is provided at the inner edge of the annular disk wall 25, as shown in FIG. 7.

Figure 4:
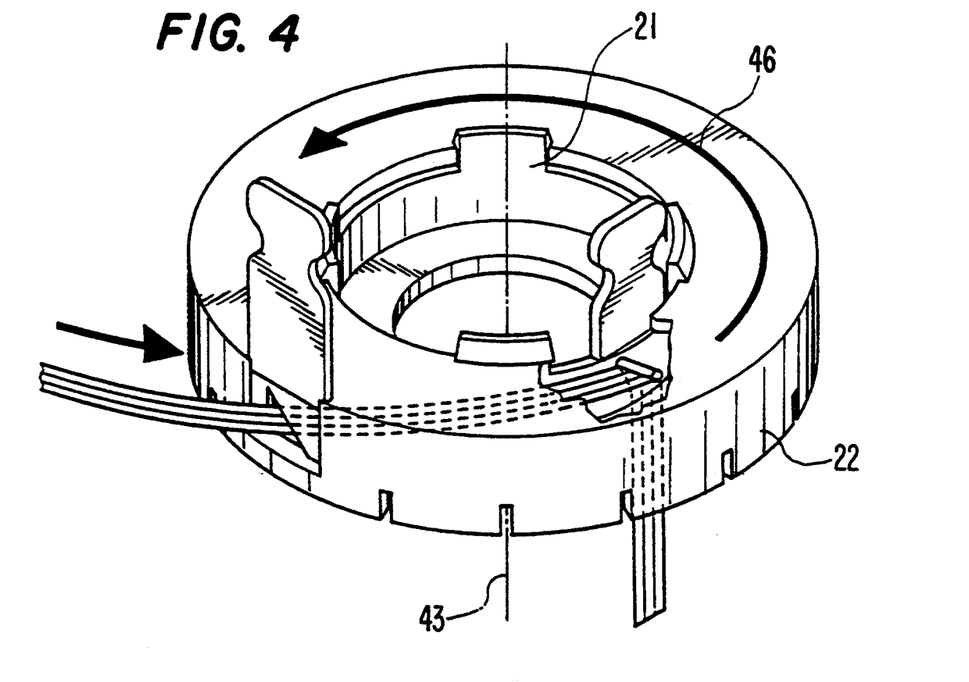
FIG. 4 is a view of the winding process for winding the cable spiral in the spiral cable box.
Figure 5:
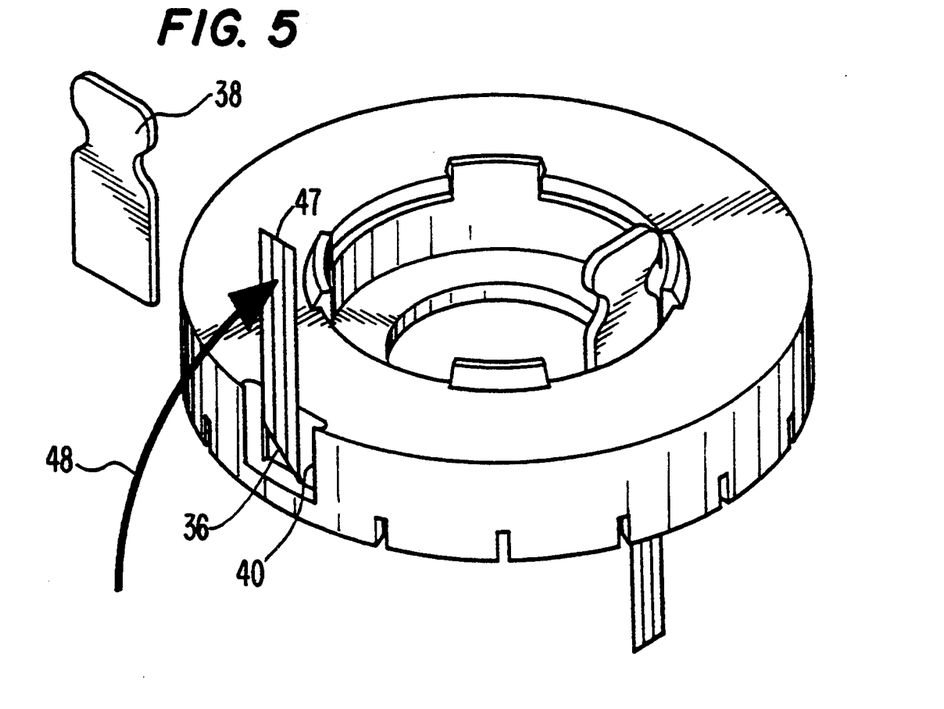
FIG. 5 is a design of the outer angular end area of the cable spiral.
Figure 6:
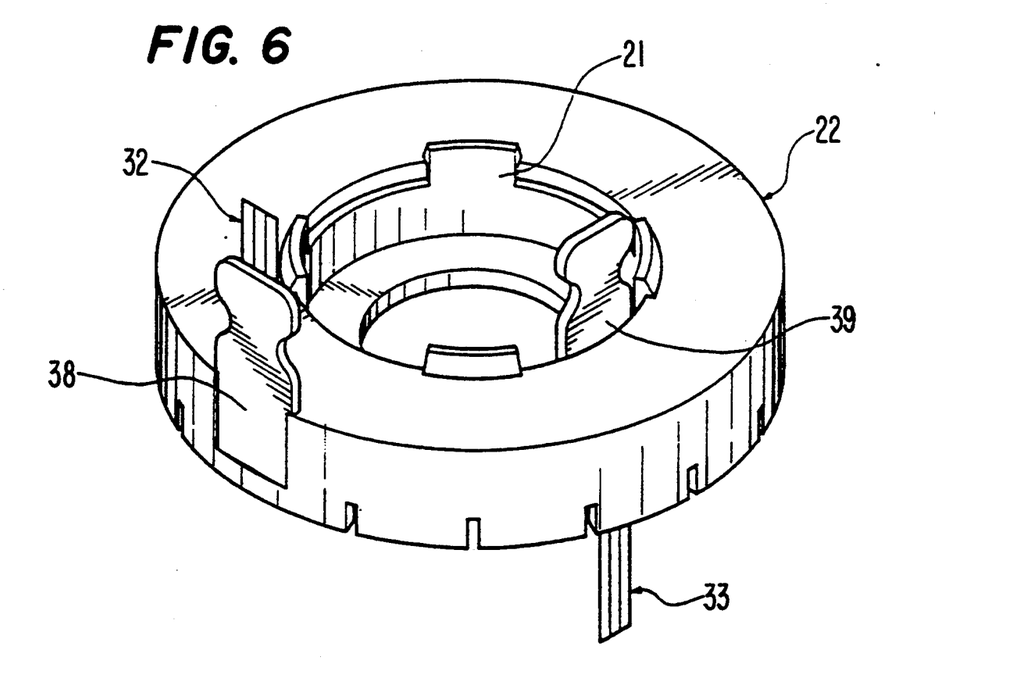
FIG. 6 is a view of the fixing of the outer angular end area of the cable spiral on the spiral cable box.

Subsequently, as shown in FIG. 4, the inner part of the spiral cable box 20, which is formed by the lower box part 21, is turned relative to the outer part of the spiral cable box 20, which is formed by the upper box part 22. The lower box part 21 with the inner protruding edge 44 of the annular disk wall 25, is put onto a winding arbor which rotates concentrically to the longitudinal box axis 43. The arrow 46 in FIG. 4 shows the revolving direction of the winding arbor. When the lower box part 21 is turned relative to the upper box part 22, the flat cable is continuously pulled into the cable receiving chamber 23 of the spiral cable box 20 through the outer cable entry opening 34 so that the cable spiral 24 is formed. After the desired number of windings of the cable spiral 24 has been reached, a protruding piece 47 which remains outside of the cable spiral box 20, is swivelled around the deflecting edge 36 in the direction of the arrow 48 to obtain a parallel alignment with the longitudinal box axis 43 and is secured in that the fixing device 38 is inserted into the grooved guide 40 (FIG. 6) so that the outer angular end area 32 of the cable spiral 24 is formed, as shown in FIG. 5.

Figure 7:
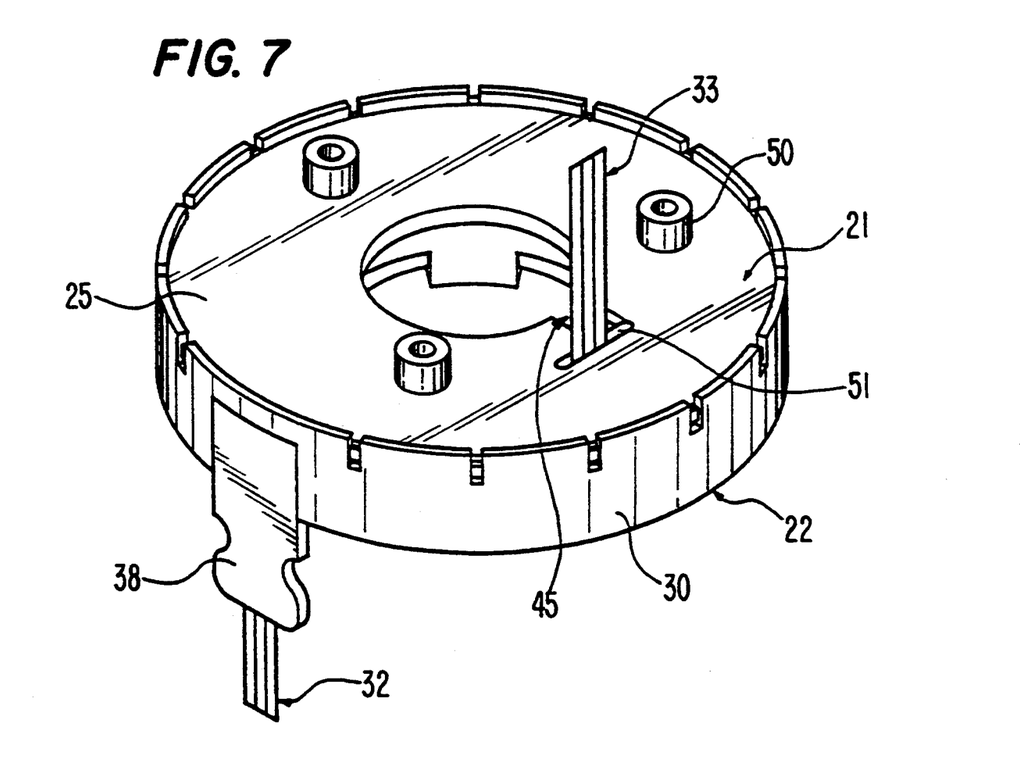
FIG. 7 is a view of the spiral cable box with cable spiral bottom plan inside.

FIG. 7 shows the spiral cable box in a bottom plan view where attachment domes 50 are provided. These domes 50 may include an inner thread 49 (see FIGS. 8, 9) and serve to attach the lower box part 21 on a steering wheel by means of a screw-type connection.

Furthermore, FIG. 7 shows an attachment slot 51 which is located in the area of the recess 45 in the annular disk wall 25, which has a transition into the recess 45 and which serves to accommodate the fixing device 39 guided in the grooved guide 40 if the lower box part 21 consists of two pieces (see also FIG. 8) in order to connect without rotation in cross-section the annular disk wall 25 with the inner cylinder wall 26.

Figure 8:
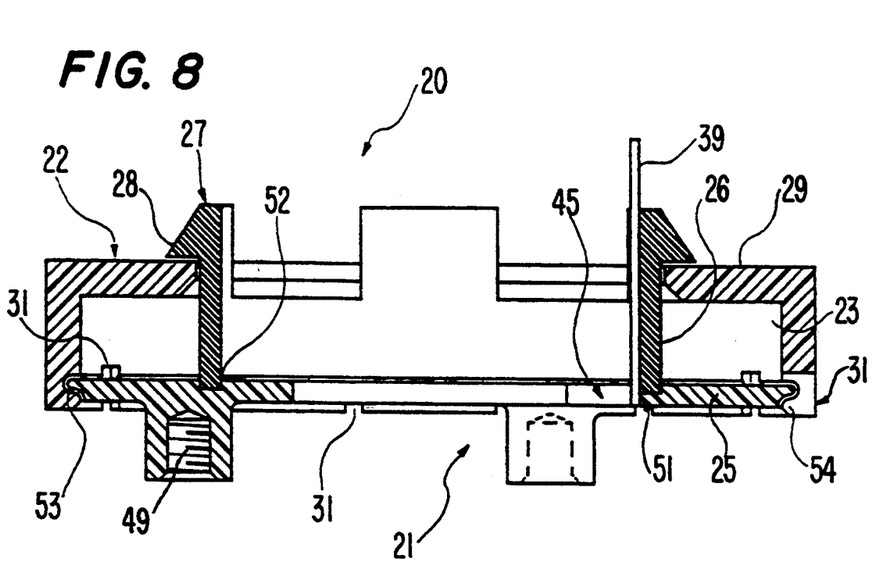
FIG. 8 is a cross sectional view of the spiral cable box.

FIG. 8 shows in cross-section a two-piece lower box part 21 in the assembled state with the upper box part 22. For a concentric arrangement of the inner cylinder wall 26 and the annular disk wall 25, the latter is provided with an axial annular groove 52 at its upper side into which the inner cylinder wall 26 can be inserted with its lower edge. The lower box part 21 and the upper box part 22 can be axially secured to each other in that a supporting guide 53 in the form of a radial annular groove is provided at the lower edge of the outer cylinder wall 30 of the upper box part 22. The supporting guide 53 at the same time serves to radially guide the lower box part 21 in the upper box part 22 in case of relative turns. When the supporting groove 53 is designed as an annular groove, an engagement ring 54 is arranged directly at the lower edge of the outer cylinder wall 30, which allows the lower box part 21 to be fixed in the upper box part 22 in a particularly accurate way.

The supporting guide 53 may also consist of a recess which extends towards the lower edge of the outer cylinder wall 30 instead of the annular groove because a simple axial stop, as provided by the recess, would be sufficient for the function of the spiral cable box 20 due to the fact that the engagement devices already constitute unilateral axial securing mechanisms.

From FIG. 8 it can be seen that the openings 31, which are arranged around the circumference of the lower edge of the outer cylinder wall 30, are a particularly advantageous possibility to remove impurities or condensed water from the cable receiving chamber 23.

FIG. 8 also shows particularly clearly that two sliding pairs are arranged between the lower box part 21 and the upper box part 22 to exactly guide the lower box part 21 in the upper box part 22. The first sliding pair is located between the engagement noses 28 of the engagement devices 27 and the upper side of the annular disk wall 29 of the upper box part 22. This sliding pair acts axially. The second sliding pair is arranged between the radial circumferential edge of the annular disk wall 25 of the lower box part 21 and the supporting guide 53 in the upper box part 22. This sliding pair acts both axially and radially.

Figure 9:
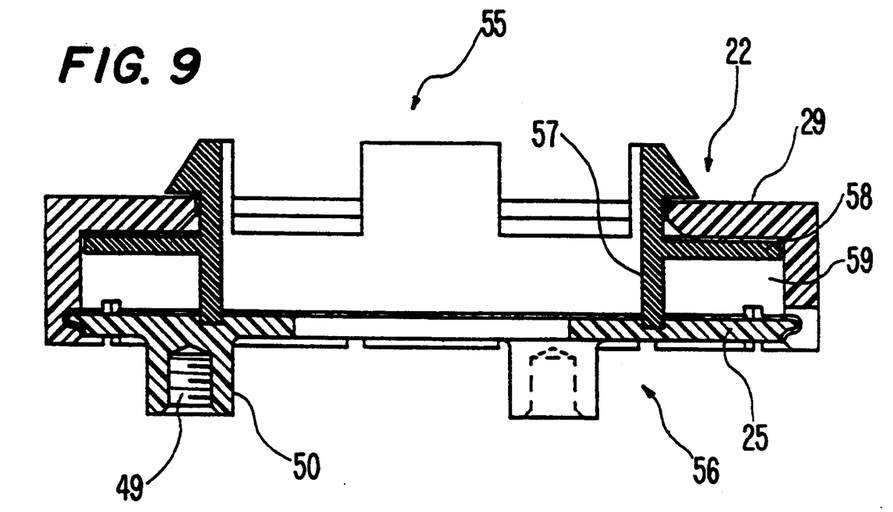
FIG. 9 is a cross sectional view of a design variant of the spiral cable box.

FIG. 9 shows a variant in the form of a spiral cable box 55 whose lower box part 56 is provided with an inner cylinder wall 57 which incorporates a bridging wall 58 parallel and directly adjacent to the annular disk wall 29 of the upper box part 22. In the embodiment shown in FIG. 9, a cable receiving chamber 59 is limited—not like the cable receiving chamber 23 by the annular disk walls 29, 25 of the upper 22 and the lower 21 box part, but by the bridging wall 58 and the annular disk wall 25 of the lower box part 21. In this way a relative turning of the walls which axially limit the cable receiving chamber 59 and a consequent wear and tear of the cable is avoided.

It is particularly in a design according to the spiral cable box 55 that a two-piece construction of the lower box part is advantageous. The connection between the parts 25 and 26 and 25 and 57 for the formation of the lower box parts 21 and 56 may be different to the connection shown in FIG. 9 or analogous to the fixing device 39 of the spiral cable box 20 shown in FIG. 8. An engagement connection or any other suitable connecting mode may also be used. The lower box part 21 may also be of a one-piece design, as shown in FIGS. 10–17, instead of comprising two or more pieces. Independently of the type of engagement device, in this case, for example, the inner protruding edge 44 shown in FIG. 10 may be dispensed with, and, if necessary, be replaced by engagement devices for the fixing device 61.

Figure 10:
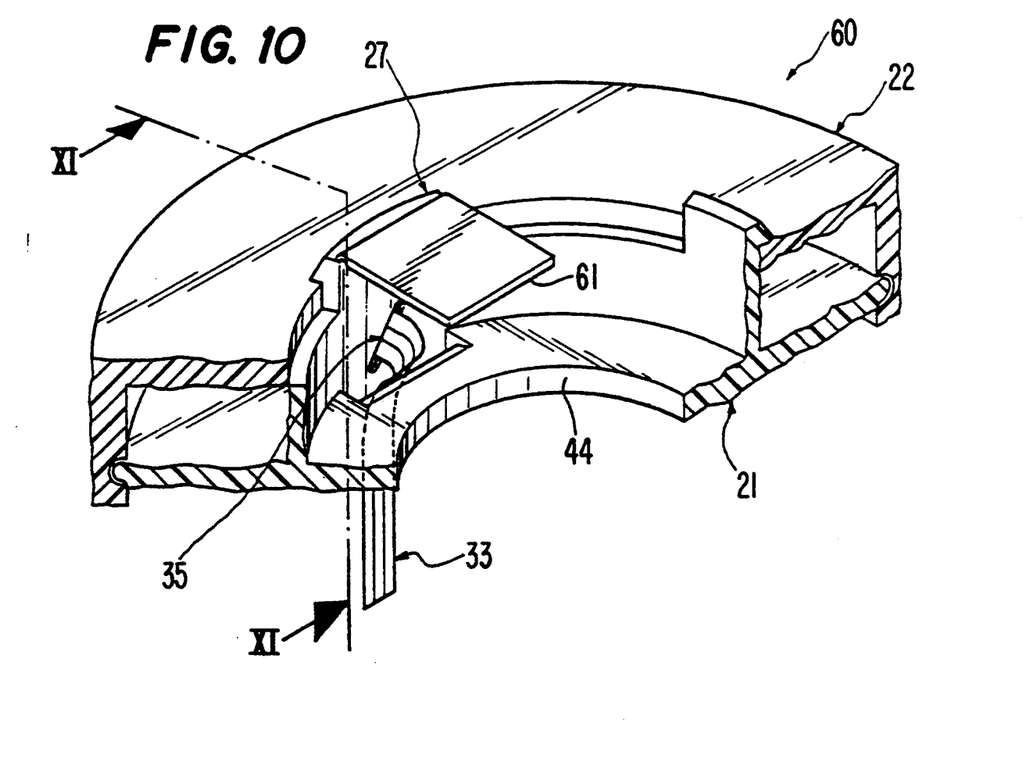
FIG. 10 is a perspective view of an inner fixing device on the spiral cable box.
Figure 11:
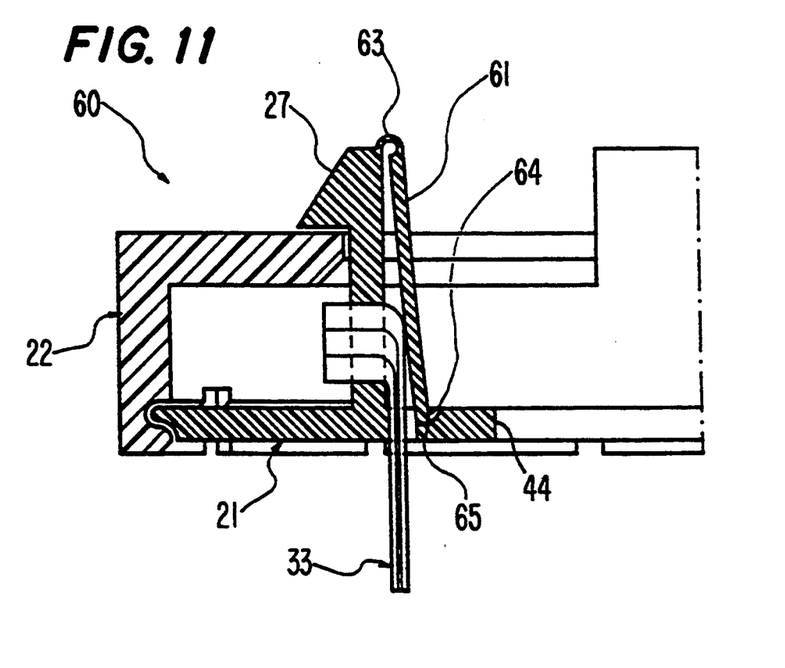
FIG. 11 is a sectional view of an attachment device according to FIG. 10 along the cut lines XI—XI in FIG. 10 in a pre-engagement position.
Figure 12:
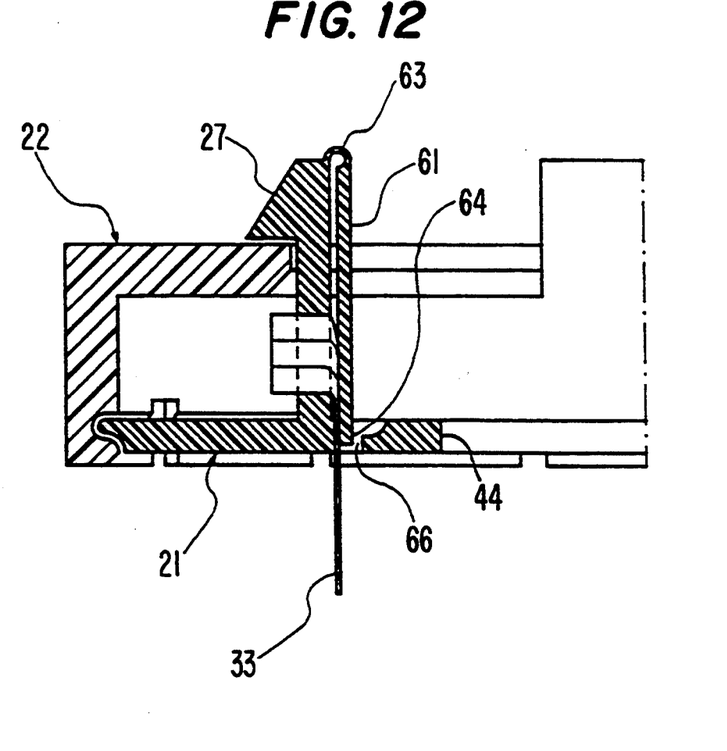
FIG. 12 is a view of the fixing device of FIG. 11 in a final engagement position.

FIGS. 10–13 show a part of a spiral cable box 60 with fixing devices 61, 62 which are integrated into a lower one-piece box part. In FIGS. 10–12 the inner fixing device 61 is connected with an engagement device 27 of the lower box part 21 in the area of the cable bushing 35.

FIG. 11 shows the fixing device 61 in a pre-engagement position. For this purpose, the fixing device 61 is swivelled against the bending resistance of the film hinge 63 towards the cable bushing 35 until an engagement edge 64 engages with an engagement recess 65 in the inner protruding edge 44 of the lower box part 21. In this position, the fixing device 61 serves as a guide for the cable end so that the cable end is automatically guided downwards when it is initially guided through the cable bushings 34, 35 (see FIG. 2). The inner angular end area 33 is secured and finally formed in that the fixing device 61 is brought into the final engagement position shown in FIG. 12. In this position, the engagement edge 64 of the fixing device 61 is located in an engagement opening 66 in the inner protruding edge 44 of the annular disk wall 25 of the lower box part 21, while the engagement opening 66 serves to guide the angular end area 33 through the inner protruding edge 44.

Figure 13:
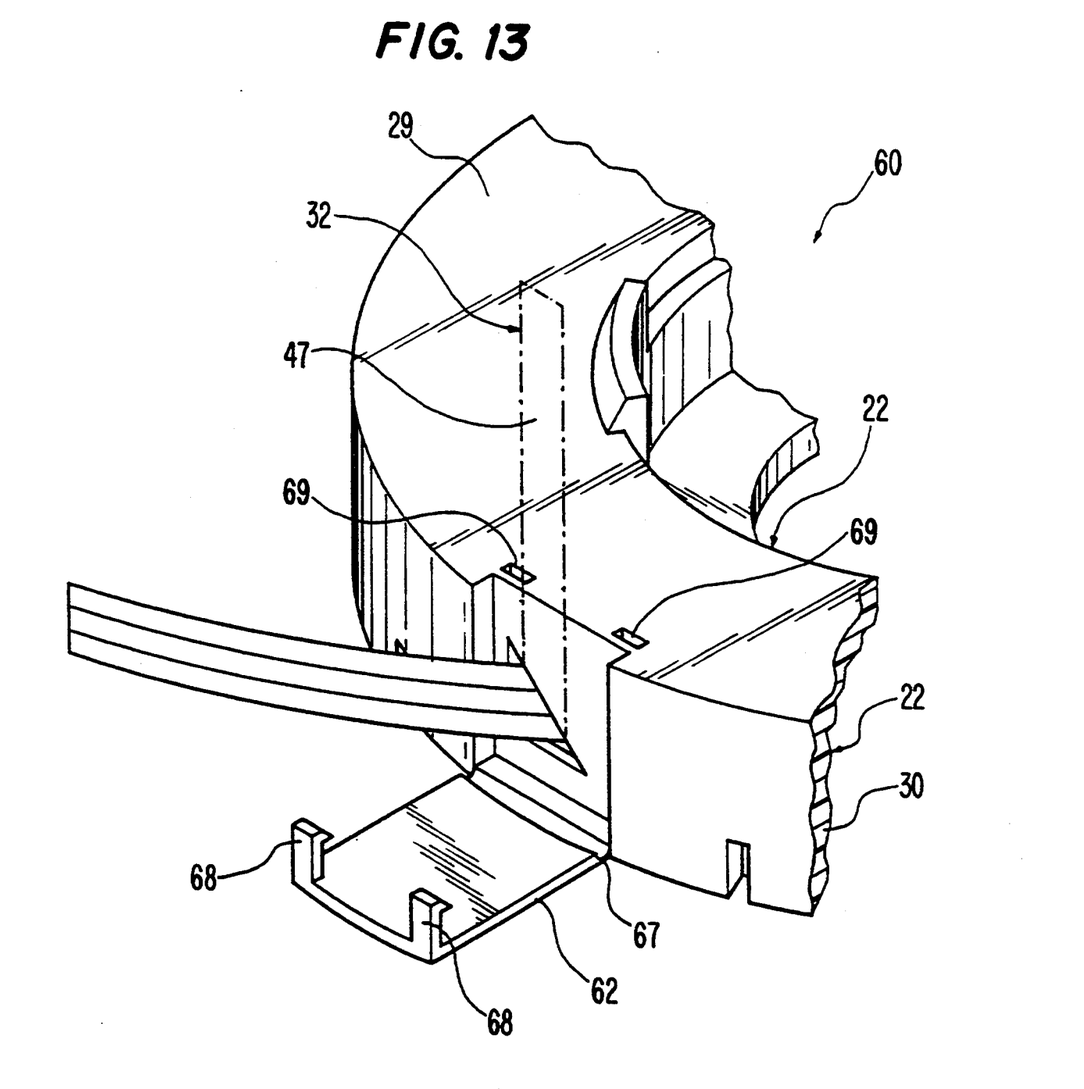
FIG. 13 is a view of an outer fixing device in non-fixed position.

FIG. 13 shows the outer fixing device 62 which is connected with the lower edge of the outer cylinder wall 30 of the upper box part 22 via a film hinge 67. In FIG. 13 the fixing device 62 is in its open position so that the flat cable can be pulled through the fixing device 62 into the spiral cable box 60 without resistance when the lower box part 21 is turned relative to the upper box part 22 (see FIG. 4). After the cable spiral has reached the desired number of windings, the protruding cable edge 47 is swivelled around the deflecting edge 36 of the outer cable bushing 34 and the fixing device 62 is swivelled towards the annular disk wall 29 of the upper box part 22 until the engagement noses 68 engage with engagement recesses 69. In this way the outer angular end area 32 of the spiral cable box 60 is formed.

Figure 14:
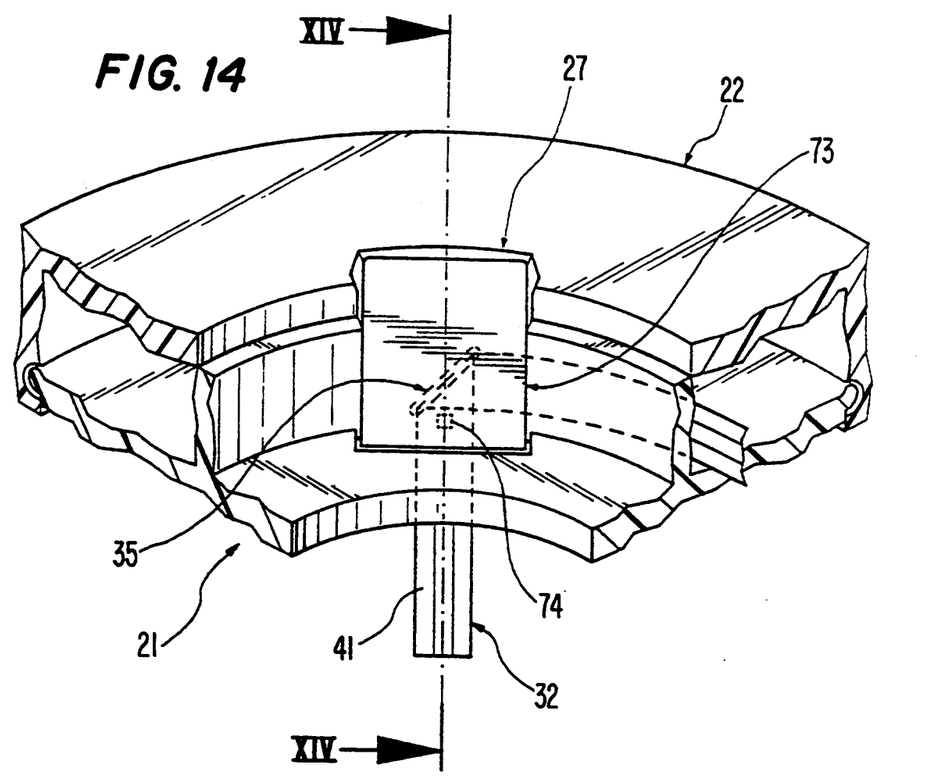
FIG. 14 is a perspective view of an alternative embodiment of a fixing device, shown by the example of an inner fixing device.
Figure 15:
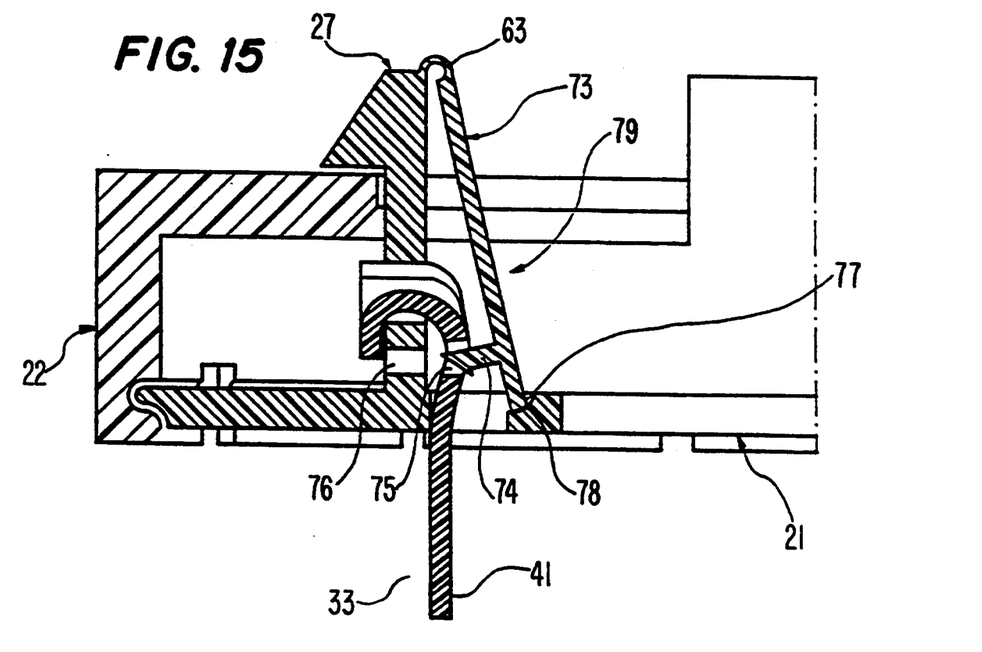
FIG. 15 is a sectional view of the fixing device of FIG. 14 along line XIV—XIV in FIG. 14, in a pre-engagement position.

FIG. 14 shows an inner fixing device 73 which is provided with an engagement device 74 in its lower part which lies below the cable bushing 35. As is further shown in FIG. 15, the engagement device 74 engages with the cable in a corresponding opening. The opening 75 is arranged in the cable in such a way that the functions of the electrical conductor paths contained in the cable are not impaired. An engagement opening 76 is provided in the inner cylinder wall 26 of the inner part 21. As shown in FIG. 15, this opening is located opposite the engagement device 74.

When the fixing device is in its pre-engagement position, as shown in FIG. 15, and the cable end is guided through the cable bushing 35 to the outside, at first the cable will engage with the opening 75 of the engagement device 74. The position of the cable end and the length of the inner protruding edge of the cable are thus exactly determined. In the pre-engagement position, the engagement edge 77 of the fixing device 73 is held stationary in an engagement opening 78 of the lower box part 21. The final engagement position is reached in that the fixing device 73 is swivelled in the direction of the arrow 79 together with the protruding cable edge 41 until the engagement device 74 engages with the engagement opening 76 in the lower box part 21.

Figure 16:
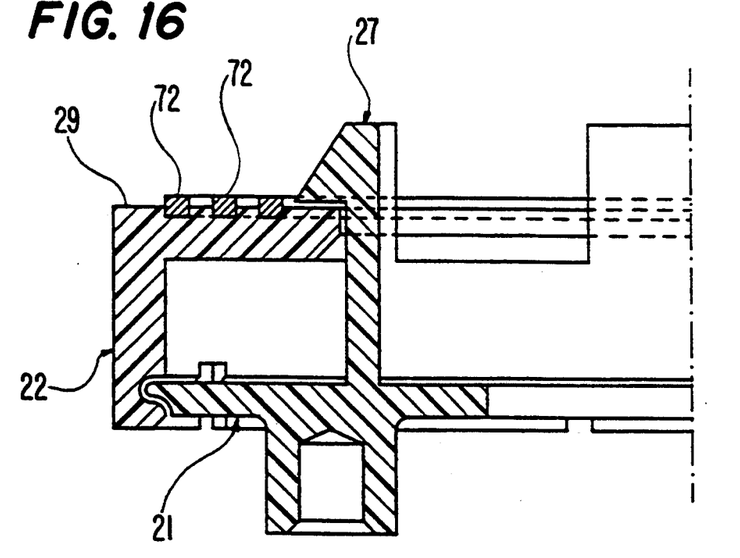
FIG. 16 is a view of the installation of slip rings on the spiral cable box.

FIG. 16 is a partly sectional view of a spiral cable box which includes additional components, in this case slip rings 72. The slip rings 72 shown in FIG. 16 are concentrically arranged on the disk wall 29 of the upper box part 22. They are secured on the disk wall 29 by being set into the wall. The slip rings 72 may be arranged at the positions shown during the manufacture of the upper box part 21, and may be constructed as a plastic molded part. Alternatively, the slip rings may be pressed into grooves on the upper side of the disk wall 29. In any case the slip rings 72 and the upper box part 22 and/or the disk wall 29 are tightly connected by the complementary shapes so that no special attachment elements are required to hold the slip rings 72 stationary.

The slip rings 72 may also be arranged in a height-staggered position to each other on the upper box part. Instead of being all arranged on the same level, for instance in that the disk wall 29 is provided with a correspondingly staggered cross section.

Figure 17:
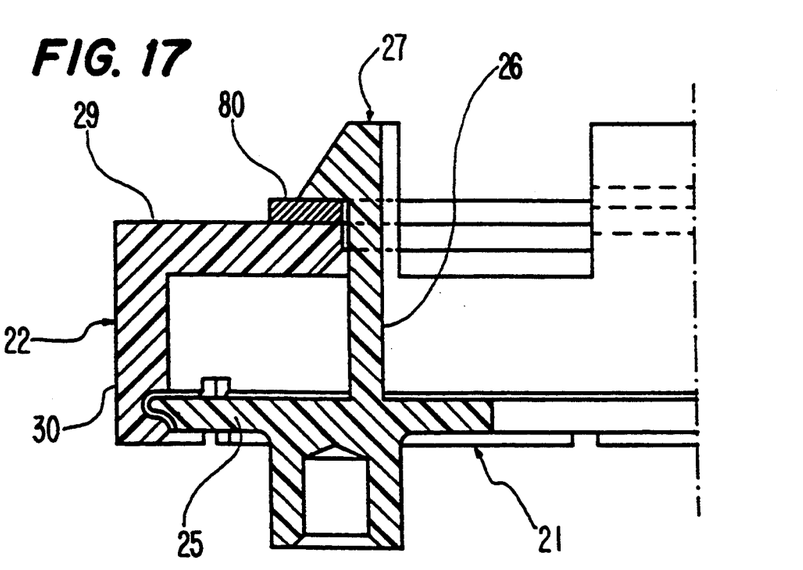
FIG. 17 is a view of an alternative possibility to install a slip ring on the spiral cable box.

As can be seen in FIG. 17, alternatively additional elements, such as the slip ring 80 may be securely integrated in the box without having to change the structure of the spiral cable box. For this purpose, the slip ring 80 may be placed between the engagement noses 28 of the engagement devices 27 and the upper side of the disk wall 20 of the upper box part 22 in a simple way. With this slip ring 80 arrangement, the slip ring may simultaneously serve as a spacer to compensate for manufacturing tolerances, if any, and to eliminate excessive play between the box parts. Again, this type of slip ring application does not require any additional fixing elements.

The slip rings 72, and 80 allow for an electrical pick-up of electric or electronic units which can be turned relative to the box part which incorporates the slip ring(s), independent of the angle of rotation. Although in FIGS. 16, 17 only the upper box part 22 is provided with one or more slip ring(s), the lower box part 21 may also be designed similarly.

Slip rings in the upper or lower box part are particularly advantageous for the connection of multi-functional operating and display units, which may be mounted in the dash face of the steering wheel, with electrical lines that are guided to the steering wheel through the steering column. The electrical lines may be realized by flat ribbon cables which allow for the electrical connection from the slip ring(s) of the spiral cable box to the electronic operating and display unit in the dash face. The connection between the flat ribbon cable and the slip ring(s) may be effected by a spring supported pick-up device which slides on the slip ring(s) and the connection between the flat ribbon cable and the electronic operating and display unit may be effected by a crimp plug-in connection or a ZIF (zero insertion force) plug-in connection or any other type of connection.

We claim:

1. A spiral cable box for the accommodation and installation of a cable spiral for an electrical air bag comprising a cable with cable ends that are angled off from the cable spiral to different sides of a spiral level to form an inner angular end area and an outer angular end area and a strain relief device containing the cable, said spiral cable box having a first outer box part and a second box inner part, which are turned relative to each other and which enclose a ring-shaped cable receiving chamber, wherein the box parts are provided with cable entry openings to guide the inner angular end area and the outer angular end area out of the box, wherein the cable receiving chamber is limited axially by a disk-shaped wall on one side and radially outside by an outer cylinder wall of the outer box part, and axially on another side by a disk wall and radially inside by an inner cylinder wall of the inner box part and wherein the cable entry openings are arranged in the outer cylinder wall of the first outer box part and the inner cylinder wall of the second inner part, and the cable entry openings are provided with deflection devices each provided with a deflection edge to cause the cable ends to deflect at an angle and with a fixing device to clamp down the cable ends between the fixing devices and the deflection devices so as to act as a strain relief.

2. A spiral cable box of claim 1, wherein the outer part incorporating the outer cylinder wall forms an upper box part and the second inner box part incorporating the inner cylinder wall forms a lower box part.

3. A spiral cable box of claim 2, wherein openings are provided in the outer cylinder wall of the upper box part and extend towards the lower edge.

4. A spiral cable box of claim 1 wherein at least one said fixing device allows for adjustment of a first pre-fixing position and a second final fixing position wherein the pre-fixing position serves to form and guide an angular end area and the final fixing position serves to attain the angular end area.

5. A spiral cable box of claim 1, wherein the fixing devices are connected with the box in a one piece design.

6. A spiral cable box of claim 1, wherein the fixing devices incorporate engagement devices which can be inserted into corresponding engagement recesses of the box.

7. A spiral cable box of claim 1, wherein each fixing device is provided with at least one engagement device which can be guided through an opening in the cable end area and which can be inserted into an engagement opening of the box.

8. A spiral cable box of claim 1, wherein the inner cylinder wall of the inner box part is provided with at least one engagement device in an edge area which can be guided through a central opening in the disk wall of the outer box part, and that said engagement device allows for a detachable connection of the inner box part with the outer box part in such a way that the two parts can be turned relative to each other.

9. A spiral cable box of claim 1, wherein the disk wall of the inner box part can be inserted with its outer circumferential edge into a supporting guide in the lower edge area of the outer cylinder wall of the outer box part.

10. A spiral cable box of claim 1, wherein the inner box part comprises two pieces, one of which is formed by the inner cylinder wall and the other one is formed by the disk wall.

11. A spiral cable box of claim 10, wherein the inner cylinder wall and the disk wall can be interlocked with each other by means of the inner fixing device to form the inner box part.

12. A spiral cable box of claim 1, wherein the disk wall of the inner box part is provided with a central opening and projects inwards over the inner cylinder wall with an inner edge forming an inner protrusion.

13. A spiral cable box of claim 1, wherein a bridging wall is provided on the inner cylinder wall and extends parallel to the disk wall in such a way that the cable receiving chamber of the box is axially limited at one side by the bridging wall.

14. A spiral cable box of claim 1, wherein a slip ring is arranged between the disk wall of the outer box part and the engagement devices of the inner box part.

15. A spiral cable box of claim 1, wherein at least one slip ring is firmly incorporated in the disk wall of the outer box part.

16. A spiral cable box of claim 14, wherein several slip rings are arranged in a vertically staggered way.

* * * * *